United States Patent
Little (10) Patent No.: US 8,917,870 B2
(45) Date of Patent: *Dec. 23, 2014

(54) METHODS AND DEVICES FOR COMPUTING A SHARED ENCRYPTION KEY

(71) Applicant: BlackBerry Limited, Waterloo (CA)

(72) Inventor: Herbert A. Little, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,478

(22) Filed: Jul. 8, 2013

(65) Prior Publication Data

US 2013/0308779 A1 Nov. 21, 2013

Related U.S. Application Data

(63) Continuation of application No. 12/713,233, filed on Feb. 26, 2010, now Pat. No. 8,510,561.

(51) Int. Cl.
| | |
|---|---|
| *H04K 1/00* | (2006.01) |
| *H04W 12/04* | (2009.01) |
| *H04L 9/08* | (2006.01) |
| *H04L 9/00* | (2006.01) |
| *H04L 9/32* | (2006.01) |

(52) U.S. Cl.
CPC ............. *H04W 12/04* (2013.01); *H04L 9/0844* (2013.01)
USPC ............ 380/270; 380/277; 380/259; 713/171

(58) Field of Classification Search
CPC ..... H04L 9/0844; H04L 9/0841; H04L 9/085; H04W 12/04
See application file for complete search history.

(56) References Cited

U.S. PATENT DOCUMENTS

| | | | | |
|---|---|---|---|---|
| 4,200,770 | A | * | 4/1980 | Hellman et al. ................. 380/30 |
| 6,049,878 | A | * | 4/2000 | Caronni et al. .................... 726/3 |

(Continued)

FOREIGN PATENT DOCUMENTS

| | | |
|---|---|---|
| CA | 2731006 | 5/2013 |
| EP | 1379052 | 1/2004 |
| EP | 2363977 | 10/2012 |

OTHER PUBLICATIONS

Document relating to CA Application No. 2731006, dated Sep. 11, 2012 (Office Action).

(Continued)

*Primary Examiner* — Dede Zecher
*Assistant Examiner* — Trang Doan
(74) *Attorney, Agent, or Firm* — Bereskin & Parr LLP/S.E.N.C.R.L., s.r.l.

(57) ABSTRACT

Embodiments described herein are generally directed to methods and devices in which computing devices, and mobile devices in particular, establish a shared encryption key for a device group comprising at least three mobile devices. In accordance with one example embodiment, a public key of a mobile device is computed using a shared password as performed in accordance with authentication acts of a password-authenticated key exchange protocol, and transmitted to at least one other mobile device of the group. A public value is computed as a function of a mobile device private key and of a public key of at least one other mobile device of the device group, in accordance with a group key establishment protocol. The public values of the mobile devices of the device group are used to compute a shared encryption key.

20 Claims, 6 Drawing Sheets

(56) References Cited

U.S. PATENT DOCUMENTS

| | | | |
|---|---|---|---|
| 8,510,561 | B2 | 8/2013 | Little |
| 8,553,887 | B2 * | 10/2013 | Hong et al. ............... 380/278 |
| 2005/0086470 | A1 | 4/2005 | Strobl et al. |
| 2008/0101600 | A1 | 5/2008 | Martin et al. |
| 2010/0131763 | A1 * | 5/2010 | Kim et al. ............... 713/171 |
| 2010/0205443 | A1 * | 8/2010 | Zhao et al. ............... 713/171 |
| 2011/0085665 | A1 * | 4/2011 | Hong et al. ............... 380/278 |

OTHER PUBLICATIONS

Michel Abdalla et al: "A Scalable Password-Based Group Key Exchange Protocol in the Standard Model"—Advances in Cryptology—Asiacrypt 2006 Lecture Notes in Computer Science; LNCS, Springer, Berlin, DE, pp. 332-347.

Jun Yao et al: "Key agreement and identity authtication protocols for ad hoc networks" Information Technology: Coding and Computing, ITCC 2004. International Conference on Las Vegas, NV, USA Apr. 5-7, 2004, Piscataway, NJ, USA IEEE LNKD-DOI: 10.1109/ITCC. 2004.1286740, vol. 2 pp. 720-724, XP010697309.

Rahman H et al: "An efficient group key agreement protocol for ad-hoc networks" Electrical and Computer Engineering, 2008. ICECE 2008. International Conference on, IEEE Piscataway, NJ, USA, pp. 478-483, EP031414907.

Dutta, Ratna, "Converting Group Key Agreement Protocol into Password-Based Setting—Case Study", Journal of Computers, vol. 2, No. 8, Oct. 2007, pp. 26-33.

Burmester. Mike et al., "A Secure and Efficient Comference Key Distribution System" Dept. of Mathematics, University of London and Dept. of EE&CE, University of Wisconsin, Springer-Verlag 1998, pp. 275-286.

Burmester. Mike et al., "A Secure and Scalable Group Key Exchange System", Computer Science Dept., Florida State University, Presented at Eurocrypt 1994, pp. 1-10.

Abdalla, Michel et al. "Password Based Group Key Exchange in a Constant Number of Rounds", Lecture Notes in Computer Science, Public Key Cryptography, PKC 2006, vol. 3958/2006, pp. 427-442.

Abdalla, Michel et al. "Simple Password-Based Encrypted Key Exchange Protocols", Departement d'informatique, Ecole Normale Supérieure, Springer-Verlag 2004-2005, pp. 1-20.

Laur, Sven et al., "SAS-Based Group Authentication and Key Agreement Protocols", Public Key Cryptography—PKC '08, 11th International Workshop on Practice and Theory in Public-Key Cryptography, Barcelona, Spain, Mar. 9-12, 2008, pp. 197-213.

Hlinovsky, Jan, "Contributory Key Agreement in Groups: Quest for Authentication", Helsinki University of Technology, Research Seminar on Network Security, Draft Nov. 7, 2006, pp. 1-4.

Document relating to CA Application No. 2731006, dated Dec. 18, 2012 (Notice of Allowance).

Document relating to CN Application No. 201110048215.7, dated May 31, 2013 (First Office Action ).

Prosecution documents relating to U.S. Appl. No. 12/713,233, now issued as 8,510,561.

Prosecution documents relating to EP Application No. 10154786.7, now issued as 2363977.

Robinson, Peter, "Multi-Party Key Agreement with ECDH", EMC Community Network, Nov. 30, 2009, retrieved from the Internet; URL: https://community.emc.com/thread/94986?tstart3, retrieved on May 3, 2012.

Document relating to CN Application No. 201110048215.7 dated Feb. 13, 2014 (Notice of Allowance).

\* cited by examiner

METHODS AND DEVICES FOR COMPUTING A SHARED ENCRYPTION KEY

CROSS-REFERENCE TO RELATED APPLICATION

This application is a continuation of U.S. patent application Ser. No. 12/713,233 filed on Feb. 26, 2010, now issued as U.S. Pat. No. 8,510,561. The entire contents of U.S. patent application Ser. No. 12/713,233 are hereby incorporated by reference.

FIELD

Embodiments described herein relate generally to cryptographic protocols for establishing an encryption key suitable for use by a group of computing devices such as mobile devices.

BACKGROUND

Symmetric and asymmetric ciphers may be used to cryptographically secure communications over an insecure channel, as known in the art.

Frequently, a shared encryption key may need to be established over the insecure channel. Methods for key establishment include Diffie-Hellman key exchange, Simple Password Exponential Key Exchange (SPEKE) and the Burmester and Desmedt (BD) protocols, for example.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Some embodiments of the systems and methods described herein make reference to a mobile device. A mobile device may be a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities), for example. A mobile device may communicate with other devices through a network of transceiver stations.

Figure 1:
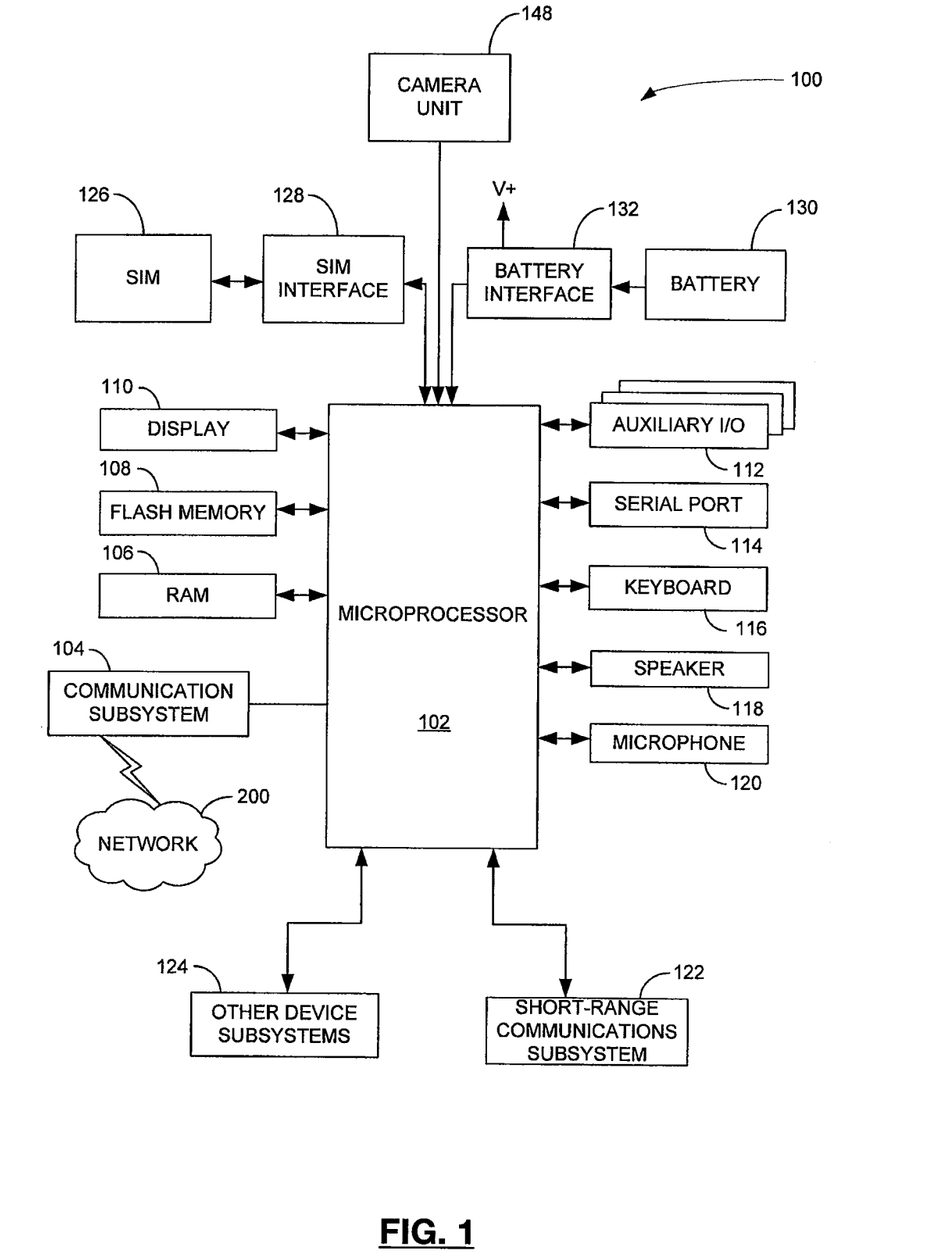
FIG. 1 is a block diagram of a mobile device in one example implementation.
Figure 2:
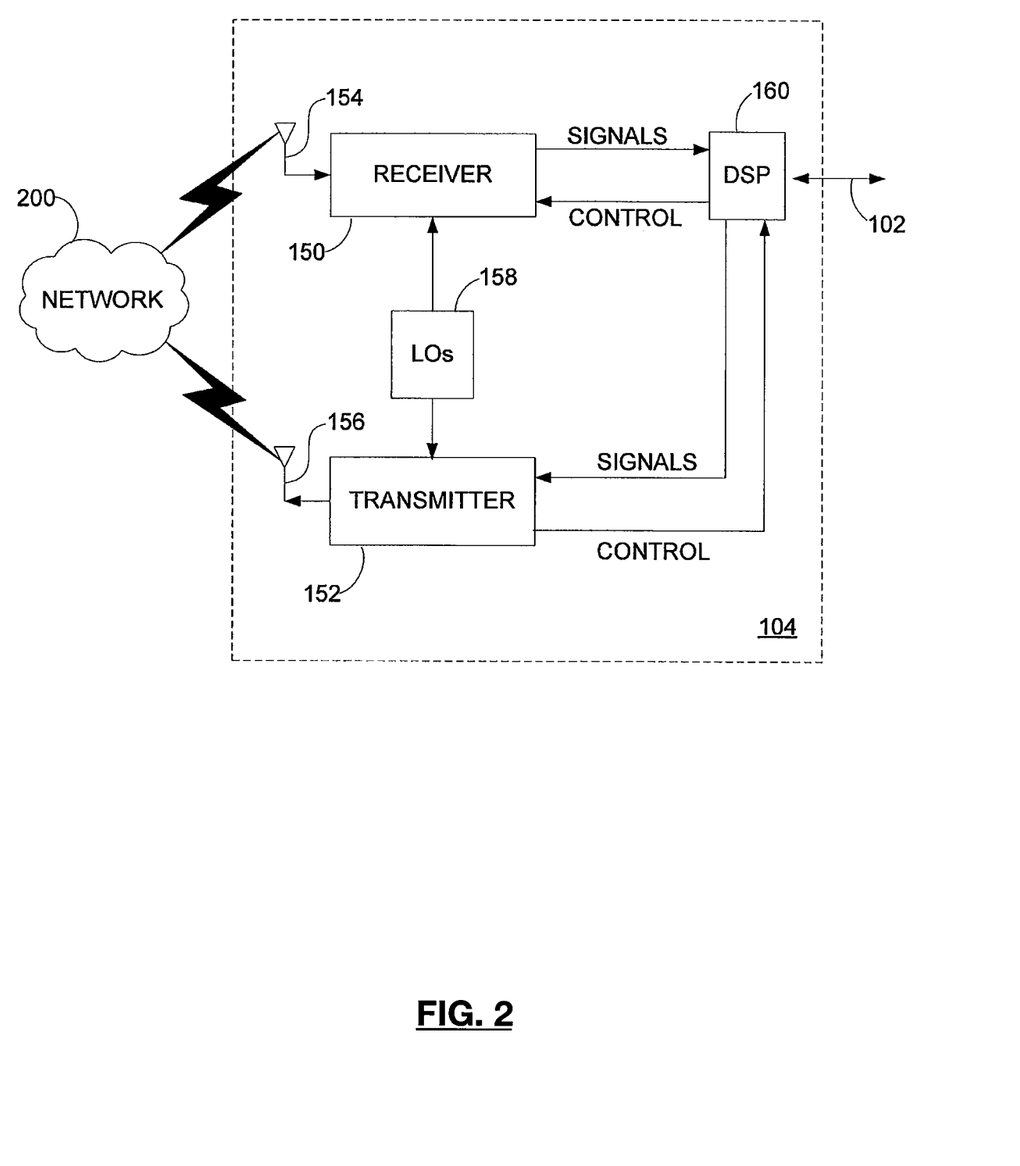
FIG. 2 is a block diagram of a communication subsystem component of the mobile device of FIG. 1.
Figure 3:
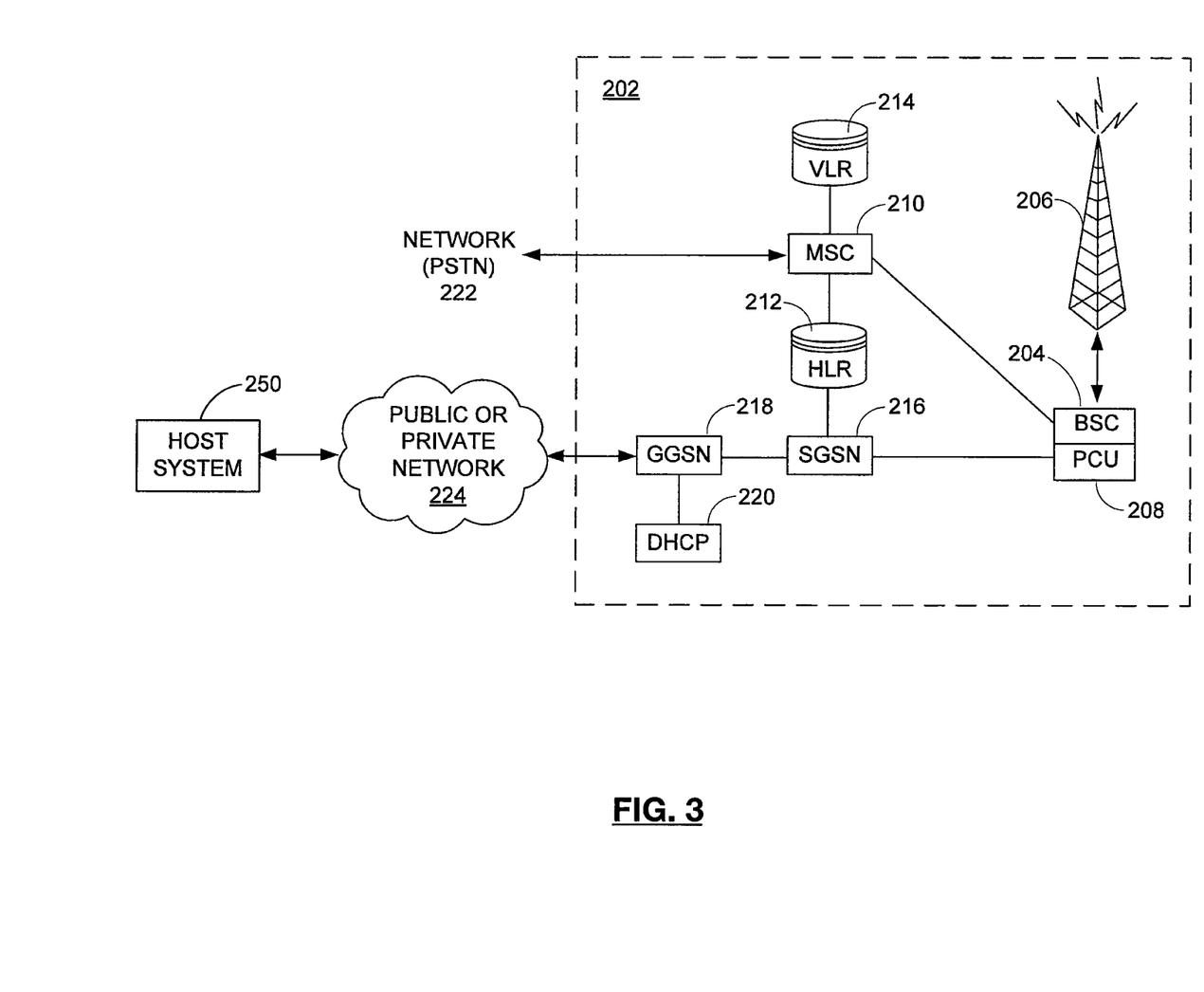
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, may be performed through communication subsystem 104. Communication subsystem 104 may be configured to receive messages from and send messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behavior described herein, and it will also be understood by persons skilled in the art that the embodiments of the present disclosure are intended to use any other suitable standards that are developed in the future. The wireless link connecting communication subsystem 104 with network 200 may represent one or more different Radio Frequency (RF) channels, operating according to defined protocols specified for GSM/GPRS communications. With newer network protocols, these channels may be capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (iDEN™), Evolution-Data Optimized (EV-DO), and High Speed Packet Access (HSPA), etc.

Microprocessor 102 may also interact with additional subsystems such as a Random Access Memory (RAM) 106, flash memory 108, display 110, auxiliary input/output (I/O) subsystem 112, serial port 114, keyboard 116, speaker 118, microphone 120, camera unit 148, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, as well as device-resident functions such as a calculator or task list. Operating system software used by microprocessor 102 is typically stored in a persistent store such as flash memory 108, which may alternatively be a read-only memory (ROM) or similar storage element (not shown). Those skilled in the art will understand that the operating system, specific device applications, or parts thereof, may be temporarily loaded into a volatile store such as RAM 106.

Mobile device 100 may send and receive communication signals over network 200 after network registration or activation procedures have been completed. Network access may be associated with a subscriber or user of a mobile device 100. To identify a subscriber, mobile device 100 may provide for a Subscriber Identity Module ("SIM") card 126 (or e.g. USIM for UMTS, or CSIM or RUIM for CDMA) to be inserted in a SIM interface 128 in order to communicate with a network. SIM 126 may be one example type of a conventional "smart card" used to identify a subscriber of mobile device 100 and to personalize the mobile device 100, among other things. Without SIM 126, mobile device 100 may not be fully operational for communication with network 200. By inserting SIM 126 into SIM interface 128, a subscriber may access all subscribed services. Services may include, without limitation: web browsing and messaging such as e-mail, voice mail, Short Message Service (SMS), and Multimedia Messaging Services (MMS). More advanced services may include, without limitation: point of sale, field service and sales force automation. SIM 126 may include a processor and memory for storing information. Once SIM 126 is inserted in SIM interface 128, it may be coupled to microprocessor 102. In order to identify the subscriber, SIM 126 may contain some user parameters such as an International Mobile Subscriber Identity (IMSI). By using SIM 126, a subscriber may not necessarily be bound by any single physical mobile device. SIM 126 may store additional subscriber information for a mobile device as well, including date book (or calendar) information and recent call information.

Mobile device 100 may be a battery-powered device and may comprise a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM may have functionality to organize and manage data items of interest to a subscriber, such as, but not limited to, e-mail, calendar events, voice mails, appointments, and task items. A PIM application may have the ability to send and receive data items via wireless network 200. PIM data items may be seamlessly integrated, synchronized, and updated via wireless network 200 with the mobile device subscriber's corresponding data items stored and/or associated with a host computer system. This functionality may create a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 may enable a subscriber to set preferences through an external device or software application, and extend the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 may provide for communication between mobile device 100 and different systems or devices, without the use of network 200. For example, subsystem 122 may include an infrared device and associated circuits and components for short-range communication. Examples of short-range communication include standards developed by the Infrared Data Association (IrDA), Bluetooth®, and the 802.11 family of standards (Wi-Fi®) developed by IEEE.

In use, a received signal such as a text message, an e-mail message, or web page download may be processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad, for example. A composed item may be transmitted over network 200 through communication subsystem 104.

For voice communications, the overall operation of mobile device 100 may be substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output may be accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 may comprise a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 may be dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is generally a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) server 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 may also contain a Packet Control Unit (PCU) 208 that connects to SGSN 216 to control segmentation, radio channel allocation and to satisfy packet switched requirements. To track mobile device location and availability for both circuit switched and packet switched management, HLR 212 may be shared between MSC 210 and SGSN 216. Access to VLR 214 may be controlled by MSC 210.

Station 206 may be a fixed transceiver station. Station 206 and BSC 204 together may form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile may be stored in HLR 212. HLR 212 may also contain location information for each registered mobile device and can be queried to determine the current location of a mobile device. MSC 210 may be responsible for a group of location areas, and may store the data of the mobile devices currently in its area of responsibility in VLR 214. Further, VLR 214 may also contain information on mobile devices that are visiting other networks. The information in VLR 214 may include part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times while requiring less use of computing resources.

SGSN 216 and GGSN 218 are elements that may be added for GPRS support; namely packet switched data support, within GSM. SGSN 216 and MSC 210 may have similar responsibilities within wireless network 200 by keeping track of the location of each mobile device 100. SGSN 216 also performs security functions and access control for data traffic on network 200. GGSN 218 may provide internetworking connections with external packet switched networks and connect to one or more SGSNs 216 via an Internet Protocol (IP) backbone network operated within the network 200. During normal operations, a given mobile device 100 may perform a "GPRS Attach" to acquire an IP address and to access data services. This normally is not present in circuit switched voice channels as Integrated Services Digital Network (ISDN) addresses may be generally used for routing incoming and outgoing calls. Currently, GPRS capable networks may use private, dynamically assigned IP addresses, using a DHCP server 220 connected to the GGSN 218. There are many mechanisms for dynamic IP assignment, including the use of a combination of a Remote Authentication Dial-In User Service (RADIUS) server and a DHCP server, for example. Once the GPRS Attach is complete, a logical connection may be established from a mobile device 100, through PCU 208, and SGSN 216 to an Access Point Node (APN) within GGSN 218, for example. The APN may represent a logical end of an IP tunnel that can either access direct Internet compatible services or private network connections. The APN may also represent a security mechanism for network 200, insofar as each mobile device 100 is assigned to one or more APNs, and mobile devices 100 cannot generally exchange data without first performing a GPRS Attach to an APN that it has been authorized to use. The APN may be considered to be similar to an Internet domain name such as "myconnection.wireless.com".

Once the GPRS Attach is complete, a tunnel may be created and all traffic exchanged within standard IP packets using any protocol that can be supported in IP packets. This may include tunneling methods such as IP over IP as in the case with some IPSecurity (IPsec) connections used with Virtual Private Networks (VPN). These tunnels are also referred to as Packet Data Protocol (PDP) Contexts and there may be a limited number of these available in the network 200. To maximize use of the PDP Contexts, network 200 will run an idle timer for each PDP Context to determine if there is a lack of activity. When a mobile device 100 is not using its PDP Context, the PDP Context may be deallocated and the IP address returned to the IP address pool managed by DHCP server 220.

Situations may arise in which computing devices, such as mobile devices, are to communicate with each other over an insecure channel, but nevertheless desire the substance of their communications to be secret or private. For example, the devices may be in communication over the public Internet, a Bluetooth® personal area network (PAN) or some other communication channel for which privacy cannot typically be assured without encrypting the data being communicated. In order to encrypt the data, symmetric or asymmetric ciphers may be employed, for example, as will be appreciated by those skilled in the art.

In certain applications where data encryption is desired, the use of symmetric ciphers such as the Advanced Encryption Standard (AES) and Blowfish, for example, may be preferred over the use of asymmetric ciphers because applications that employ symmetric ciphers tend to be less resource intensive. This may be particularly important where the communicating devices have constrained processing ability due to battery limits or processing power, such as in mobile device 100.

However, symmetric ciphers require the use of a symmetric encryption key. Typically, the symmetric encryption key is distributed in some manner to be shared amongst all devices that intend to encrypt data using that key, prior to establishing secure communications between the devices.

Known protocols exist that allow two parties to jointly establish a shared encryption key, such as Diffie-Hellman key exchange (DH) and Simple Password Exponential Key Exchange (SPEKE).

The Diffie-Hellman key exchange protocol allows two parties to jointly establish a shared secret key over an insecure communications channel. Although the Diffie-Hellman key exchange protocol is considered secure against passive eavesdroppers, it is vulnerable to an active adversary performing a man-in-the-middle attack because it does not provide for authentication of the parties. In practice, this authentication may be provided by relying on a public key infrastructure (PKI) to authenticate the keys used in the key exchange protocol, for example.

The SPEKE protocol extends the Diffie-Hellman key exchange protocol to include password authentication, and thereby provides security against a man-in-the-middle attack. Password authentication may be achieved using a simple password that may be exchanged between the parties out of band, for example, via telephone or in person. A password authentication key exchange protocol generally requires that both parties prove knowledge of the password to each other during the key establishment process. The password is essentially used as a basis for generating the more complex encryption key under the protocol. The password itself is "simple" as it may be short, and therefore, more convenient to initially exchange between the two parties than, for example, exchanging the more complex encryption key.

Accordingly, when a password authentication key exchange protocol is employed, there is no need to rely upon other authentication methods such as device certificates and a public key infrastructure. However, like the Diffie-Hellman key exchange protocol, SPEKE is a protocol that is specifically employed to establish a shared encryption key between two parties.

In certain applications, it may be desirable to establish a shared encryption key between three or more parties. In such situations, the use of Diffie-Hellman key exchange or SPEKE alone may be inefficient or impractical, since this would typically require that each party separately negotiate a shared encryption key with each other party.

However, other known protocols exist that are specifically directed to establishing a shared encryption key between a group of three or more parties (e.g. devices).

For example, the Burmester-Desmedt protocol is a group key establishment protocol that is secure against passive eavesdroppers. However, like the Diffie-Hellman key exchange protocol, the Burmester and Desmedt protocol does not provide for authentication of the group members.

Accordingly, to defend against man-in-the-middle attacks by active adversaries, authentication of group members would generally need to employ additional methods that rely on a PKI, for example.

However, in some applications, reliance upon PKI may be impractical. For example, access to a common PKI may not be available, or the burden of procuring certificates may impose an unwanted cost for some groups. By way of further example, each mobile device in a group of mobile devices may have limited bandwidth and processing ability. For even relatively small device groups, the bandwidth and processing required to obtain and verify certificates and keys for each member of the device group may impose undesirable time and power constraints in applications of the group key establishment protocol.

The present inventor recognized that by integrating the authentication capabilities of a password-authenticated key exchange protocol (e.g. SPEKE) with the key establishment capabilities of a group key establishment protocol (e.g. Burmester and Desmedt), a highly secure method for generating a shared encryption key for a group of three or more devices may be provided.

Embodiments described herein are generally directed to methods and devices in which computing devices, and mobile devices in particular, establish a group key that incorporates password authentication in an efficient manner.

Certain embodiments relate to a method for computing a shared encryption key (k) for a group of n mobile devices, the group of n mobile devices comprising at least three mobile devices. The method may comprise, for an i-th mobile device of the group of n mobile devices: computing a public key ($X_i$) for the mobile device for transmission to at least one first other mobile device of the group of n mobile devices, wherein the public key ($X_i$) for the mobile device is a function of at least a private key ($x_i$) associated with the mobile device and of a shared password ($\pi$) known to all mobile devices of the group of n mobile devices; computing a public value ($K_i$) for the mobile device for transmission to each of all other mobile devices of the group of n mobile devices, wherein the public value ($K_i$) for the mobile device is a function of at least the private key ($x_i$) associated with the mobile device and of a public key ($X_{i-1}$, $X_{i+1}$) of each of at least one second other mobile device of the group of n mobile devices; and using the public value ($K_1$, . . . $K_{i-1}$, $K_{i+1}$, . . . $K_n$) of each of all other mobile devices of the group of n mobile devices to compute the shared encryption key (k) in accordance with a group key establishment protocol.

In some embodiments, the computing the public value and the using the public value are performed in accordance with the group key establishment protocol, and the group key establishment protocol comprises a Burmester and Desmedt protocol.

The method may further comprise, in one embodiment, for the i-th mobile device of the group of n mobile devices: transmitting the public key ($X_i$) for the mobile device to the at least one first other mobile device of the group of n mobile devices; and receiving the public key ($X_{i-1}$, $X_{i+1}$) of each of at least one second other mobile device of the group of n mobile devices. In variant embodiments, the i-th mobile device of the group of n mobile devices is coupled to a hub device, and at least one of said transmitting the public key or receiving the public key is performed via the hub device.

The method may further comprise, in one embodiment, for the i-th mobile device of the group of n mobile devices: transmitting the public value (K) for the mobile device to each of all other mobile devices of the group of n mobile devices; and receiving the public value ($K_1, \ldots K_{i-1}, K_{i+1}, \ldots K_n$) of each of all other mobile devices of the group of n mobile devices. In variant embodiments, the i-th mobile device of the group of n mobile devices is coupled to a hub device, and at least one of said transmitting the public value or receiving the public value is performed via the hub device.

The method may further comprise, in one embodiment, for the i-th mobile device of the group of n mobile devices: computing a key confirmation value ($V_i$) for the mobile device, wherein the key confirmation value ($V_i$) for the mobile device is a function of at least the shared password ($\pi$); transmitting the key confirmation value ($V_i$) for the mobile device to each of all other mobile devices of the group of n mobile devices; receiving a key confirmation value ($V_1, \ldots V_{i-1}, V_{i+1}, \ldots V_n$) from each of all other mobile devices of the group of n mobile devices; computing a verification value for each of all other mobile devices of the group of n mobile devices, wherein the verification value is a function of at least the shared password ($\pi$); and for at least one other mobile device of the group of n mobile devices, comparing the key confirmation value ($V_i$) received from the at least one other mobile device with the verification value computed for the at least one other mobile device to determine if there is a mismatch. In variant embodiments, the i-th mobile device of the group of n mobile devices is coupled to a hub device, and at least one of said transmitting the key confirmation value or receiving the key confirmation value is performed via the hub device.

In at least one variant embodiment, the public key ($X_i$) for the i-th mobile device is computed as a product of the private key ($x_i$) associated with the mobile device and a hash ($h_1(\pi)$) of the shared password; the group of n mobile devices is defined such that a left neighbor (i−1) and a right neighbor (i+1) is defined for the i-th mobile device of the group of n mobile devices; and the method further comprises, for the i-th mobile device of the group of n mobile devices: applying a Diffie-Hellman computation to derive at least a first Diffie-Hellman result ($L_i$) and a second Diffie-Hellman result ($R_i$) for the mobile device, wherein the first Diffie-Hellman result ($L_i$) for the mobile device is a function of at least the private key ($x_i$) associated with the mobile device and a public key ($X_{i-1}$) of the left neighbor of the mobile device, and wherein the second Diffie-Hellman result ($R_i$) for the mobile device is a function of at least the private key ($x_i$) associated with the mobile device and a public key ($X_{i+1}$) of the right neighbor of the mobile device; wherein the public value ($K_i$) computed for the mobile device is a function of at least the first Diffie-Hellman result ($L_i$) and the second Diffie-Hellman result ($R_i$) for the mobile device; and wherein the key confirmation value ($V_i$) for the mobile device is a function of at least the hash ($h_1(\pi)$) of the shared password, and at least one of the first Diffie-Hellman result ($L_i$) or the second Diffie-Hellman result ($R_i$) for the mobile device.

In some embodiments, for the i-th mobile device of the group of n mobile devices: the first Diffie-Hellman result ($L_i$) for the mobile device is computed as a hash ($h_2(x_i * X_{i-1})$) of a product of the private key associated with the mobile device and the public key of the left neighbor of the mobile device, and the second Diffie-Hellman result ($R_i$) for the mobile device is computed as a hash ($h_2(x_i * X_{i+1})$) of a product of the private key associated with the mobile device and the public key of the right neighbor of the mobile device.

The method may further comprise, in one embodiment, for the i-th mobile device of the group of n mobile devices: applying a Diffie-Hellman computation to derive at least one of a first Diffie-Hellman result ($L_j$) or a second Diffie-Hellman result ($R_j$) for each of all other mobile devices of the group of n mobile devices, such that the public value ($K_1, \ldots K_{i-1}, K_{i+1}, \ldots K_n$) of each of all other mobile devices of the group of n mobile devices is used; wherein the verification value computed for a given other j-th mobile device of the group of n mobile devices is a function of at least the hash ($h_1(\pi)$) of the shared password and at least one of the first Diffie-Hellman result ($L_j$) or the second Diffie-Hellman result ($R_j$) derived for the given other j-th mobile device.

In some embodiments, for the i-th mobile device of the group of n mobile devices: the key confirmation value ($V_i$) computed for the mobile device is computed as a keyed-hash message authentication code based at least on the hash ($h_1(\pi)$) of the shared password and on the at least one of the first Diffie-Hellman result ($L_i$) or the second Diffie-Hellman result ($R_i$) for the mobile device; and the verification value computed for the given other j-th mobile device of the group of n mobile devices is computed as a keyed-hash message authentication code based at least on the hash ($h_1(\pi)$) of the shared password and the at least one of the first Diffie-Hellman result ($L_j$) or the second Diffie-Hellman result ($R_j$) derived for the given other j-th mobile device.

In some embodiments, the shared encryption key (k) is computed as a product of a plurality of Diffie-Hellman results, the plurality of Diffie-Hellman results comprising at least one of a first Diffie-Hellman result ($L_1, \ldots L_n$) for each of all mobile devices of the group of n mobile devices or a second Diffie-Hellman result ($R_1, \ldots R_n$) for each of all mobile devices of the group of n mobile devices. The shared encryption key (k) may comprise a symmetric key.

The method may further comprise, in at least one embodiment, prior to computing the public key ($X_i$) for the i-th mobile device of the group of n mobile devices: distributing the shared password ($\pi$) to all mobile devices of the group of n mobile devices.

In some embodiments, for the i-th mobile device of the group of n mobile devices, the public key ($X_i$) for the mobile device is computed as a product of the private key ($x_i$) associated with the mobile device and a hash ($h_1(\pi)$) of the shared password. The hash ($h_1(\pi)$) of the shared password may be defined as a point on an elliptic curve.

In one embodiment, the group of n mobile devices may be defined such that a left neighbor (i−1) and a right neighbor (i+1) is defined for the i-th mobile device of the group of n mobile devices, and the method may further comprise, for the i-th mobile device of the group of n mobile devices: applying a Diffie-Hellman computation to derive at least a first Diffie-Hellman result ($L_i$) and a second Diffie-Hellman result ($R_i$) for the mobile device, wherein the first Diffie-Hellman result ($L_i$) for the mobile device is a function of at least the private key ($x_i$) associated with the mobile device and a public key ($X_{i-1}$) of the left neighbor of the mobile device, and wherein the second Diffie-Hellman result ($R_i$) for the mobile device is a function of at least the private key ($x_i$) associated with the mobile device and a public key ($X_{i+1}$) of the right neighbor of the mobile device; wherein the public value ($K_i$) computed for the mobile device is a function of at least the first Diffie-Hellman result ($L_i$) and the second Diffie-Hellman result ($R_i$) for the mobile device.

In some embodiments, for the i-th mobile device of the group of n mobile devices: the first Diffie-Hellman result ($L_i$) for the mobile device is computed as a hash ($h_2(x_i*X_{i-1})$) of a product of the private key associated with the mobile device and the public key of the left neighbor of the mobile device, and the second Diffie-Hellman result ($R_i$) for the mobile device is computed as a hash ($h_2(x_i*X_{i+1})$) of a product of the private key associated with the mobile device and the public key of the right neighbor of the mobile device.

The method may further comprise, in one embodiment, for the i-th mobile device of the group of n mobile devices, applying a Diffie-Hellman computation to derive at least one of a first Diffie-Hellman result ($L_j$) or a second Diffie-Hellman result ($R_j$) for each of all other mobile devices of the group of n mobile devices, such that the public value ($K_1, \ldots K_{i-1}, K_{i+1}, \ldots K_n$) of each of all other mobile devices of the group of n mobile devices is used; and the shared encryption key (k) may be computed as a product of a plurality of Diffie-Hellman results, the plurality of Diffie-Hellman results comprising at least one of a first Diffie-Hellman result ($L_1, \ldots L_n$) for each of all mobile devices of the group of n mobile devices or a second Diffie-Hellman result ($R_1, \ldots R_n$) for each of all mobile devices of the group of n mobile devices.

Further embodiments relate to a mobile device for computing a shared encryption key (k) in a group of n mobile devices, the group of n mobile devices comprising at least three mobile devices. An i-th mobile device may comprise, in one embodiment: a processor; and a memory; wherein the processor is configured to compute a public key ($X_i$) for the mobile device for transmission to at least one first other mobile device of the group of n mobile devices, wherein the public key ($X_i$) for the mobile device is a function of at least a private key ($x_i$) associated with the mobile device and of a shared password ($\pi$) known to all mobile devices of the group of n mobile devices; compute a public value ($K_i$) for the mobile device for transmission to each of all other mobile devices of the group of n mobile devices, wherein the public value ($K_i$) for the mobile device is a function of at least the private key ($x_i$) associated with the mobile device and of a public key ($X_{i-1}$, $X_{i+1}$) of each of at least one second other mobile device of the group of n mobile devices; and use the public value ($K_1, \ldots K_{i-1}, K_{i+1}, \ldots K_n$) of each of all other mobile devices of the group of n mobile devices to compute the shared encryption key (k) in accordance with a group key establishment protocol.

Still further embodiments relate to a computer readable storage medium having stored therein a computer program which, when executed by a processor of a mobile device, causes the processor to perform a method for computing a shared encryption key (k) for a group of n mobile devices, the group of n mobile devices comprising at least three mobile devices. The method may comprise, in one embodiment: for an i-th mobile device of the group of n mobile devices: computing a public key ($X_i$) for the mobile device for transmission to at least one first other mobile device of the group of n mobile devices, wherein the public key ($X_i$) for the mobile device is a function of at least a private key ($x_i$) associated with the mobile device and of a shared password ($\pi$) known to all mobile devices of the group of n mobile devices; computing a public value ($K_i$) for the mobile device for transmission to each of all other mobile devices of the group of n mobile devices, wherein the public value ($K_i$) for the mobile device is a function of at least the private key ($x_i$) associated with the mobile device and of a public key ($X_{i-1}$, $X_{i+1}$) of each of at least one second other mobile device of the group of n mobile devices; and using the public value ($K_1, \ldots K_{i-1}, K_{i+1}, \ldots K_n$) of each of all other mobile devices of the group of n mobile devices to compute the shared encryption key (k) in accordance with a group key establishment protocol.

These and other aspects and features of various embodiments will be described in greater detail below.

Figure 4A:
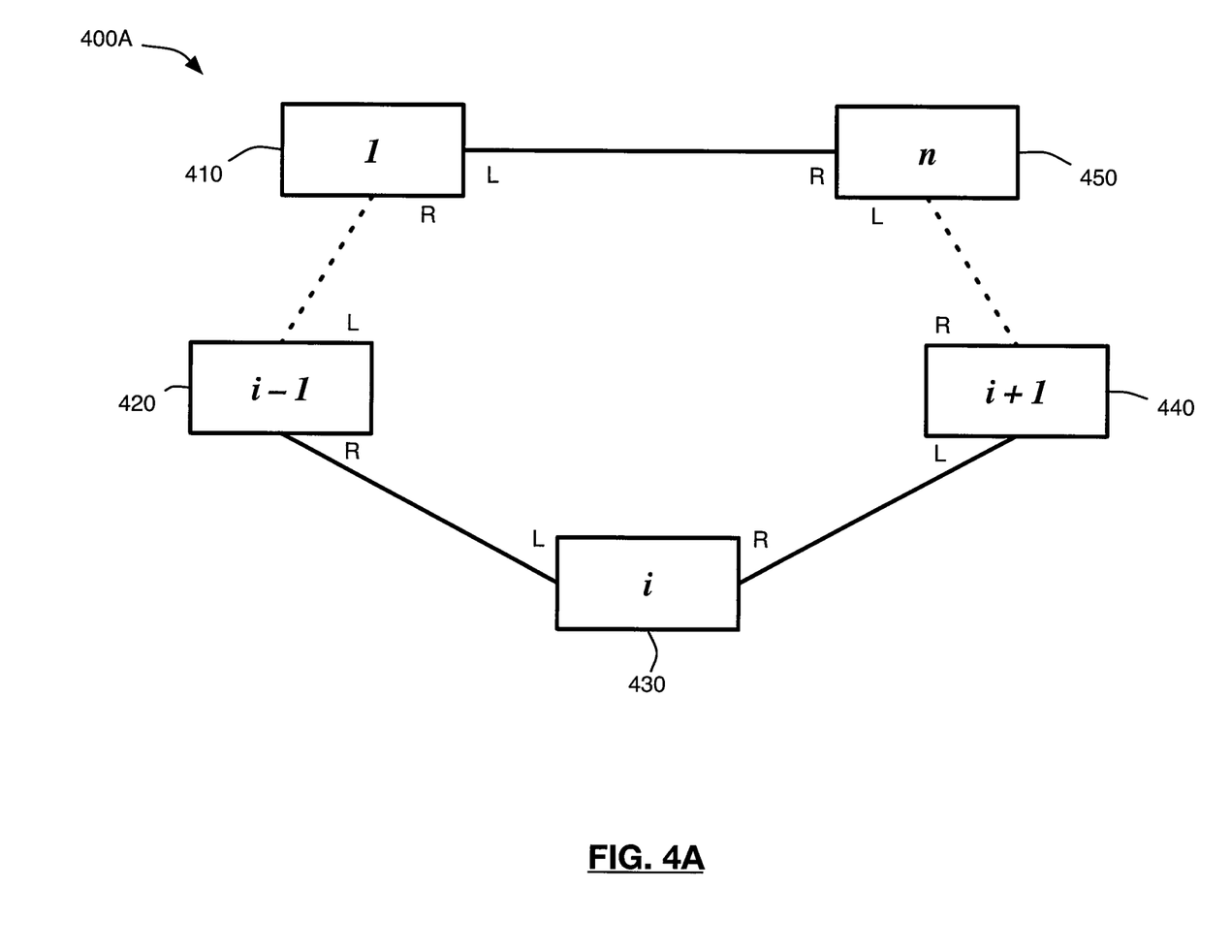
FIG. 4A is a block diagram illustrating a group of devices in one example implementation.

Reference is first made to FIG. 4A, in which a block diagram illustrating a group of devices is shown generally as 400A, in one example implementation.

Device group 400A will typically comprise a group of computing devices, such as computing devices 410, 420, 430, 440 and 450. It will be appreciated that although only five devices are depicted in FIG. 4A, the device group could comprise a larger number of devices, or as few as three devices.

In at least one embodiment, each of computing devices 410, 420, 430, 440 and 450 comprises a mobile device, such as mobile device 100. In other embodiments, device group 400A may comprise any combination of computing devices, which may include, for example, mobile devices, desktop computers, laptop computers, personal digital assistants, or the like.

The computing devices in device group 400A are, in one embodiment, configured to communicate with each other using a data communication protocol such as UMTS, Bluetooth®, or the like. In other embodiments, communication between the computing devices may be achieved using heterogeneous communication means, for example a combination of Ethernet and IEEE 802.11 wireless networking.

The use of a broadcast (or multicast) scheme is advantageous, although not necessary, since certain values may be shared with all members of the device group.

The composition of the device group may be defined by an administrator, for example. The administrator may determine how many devices, and identify which particular devices are to share the encryption key to be generated in accordance with an embodiment of a method of computing a shared encryption key as described herein.

Once the devices of device group 400A are identified, a logical order may be determined according to some predetermined method. For example, the devices may be ordered according to a Personal Identification Number associated with each device (where "personal" refers to or is somehow associated with the respective device), or some other ordering technique may be employed.

Alternatively, each device may be randomly allocated a position in the order, according to a suitable predetermined method. For example, it may be convenient to use one form of network address (e.g., IP address, wireless MAC address, Ethernet MAC address, etc.) or another unique identifying number (e.g., PIN) to allocate positions in the order, as these will be unique and known to each device in the device group. The position of each device in the order may also be assigned by an administrator. Accordingly, the ordering will be known or made known to all members of the device group, and will be consistent for each member of the device group.

Once an ordering of the devices of device group 400A is established, an index i may be associated with the i-th device, where the devices are ordered from 1 to n based on the determined order.

As illustrated in FIG. 4A, the computing devices in device group 400A may be considered to define a logical ring topology according to the determined order. Accordingly, a right neighbor and a left neighbor will be defined for each device of device group 400A. For example, for the i-th device 430, the right neighbor is the (i+1)-th device 440, while the left neighbor is the (i−1)-th device 420. According to the ring topology, devices at the beginning and the end of the logical order have each other as left and right neighbors, respectively, as illustrated by devices 410 and 450.

The devices in device group 400A are shown in a ring topology to illustrate generally that an index may be associated with each of the devices, and that a left and right neighbor is defined for each device, to assist in the understanding of the embodiments described in further detail below. However, the connecting lines illustrated in FIG. 4A do not suggest that a particular device can only communicate with its left or right neighbor. In at least one embodiment, each device may be configured to communicate directly with each other device (or a subset of other devices) in device group 400A, over established communication channels (not explicitly shown).

Figure 4B:
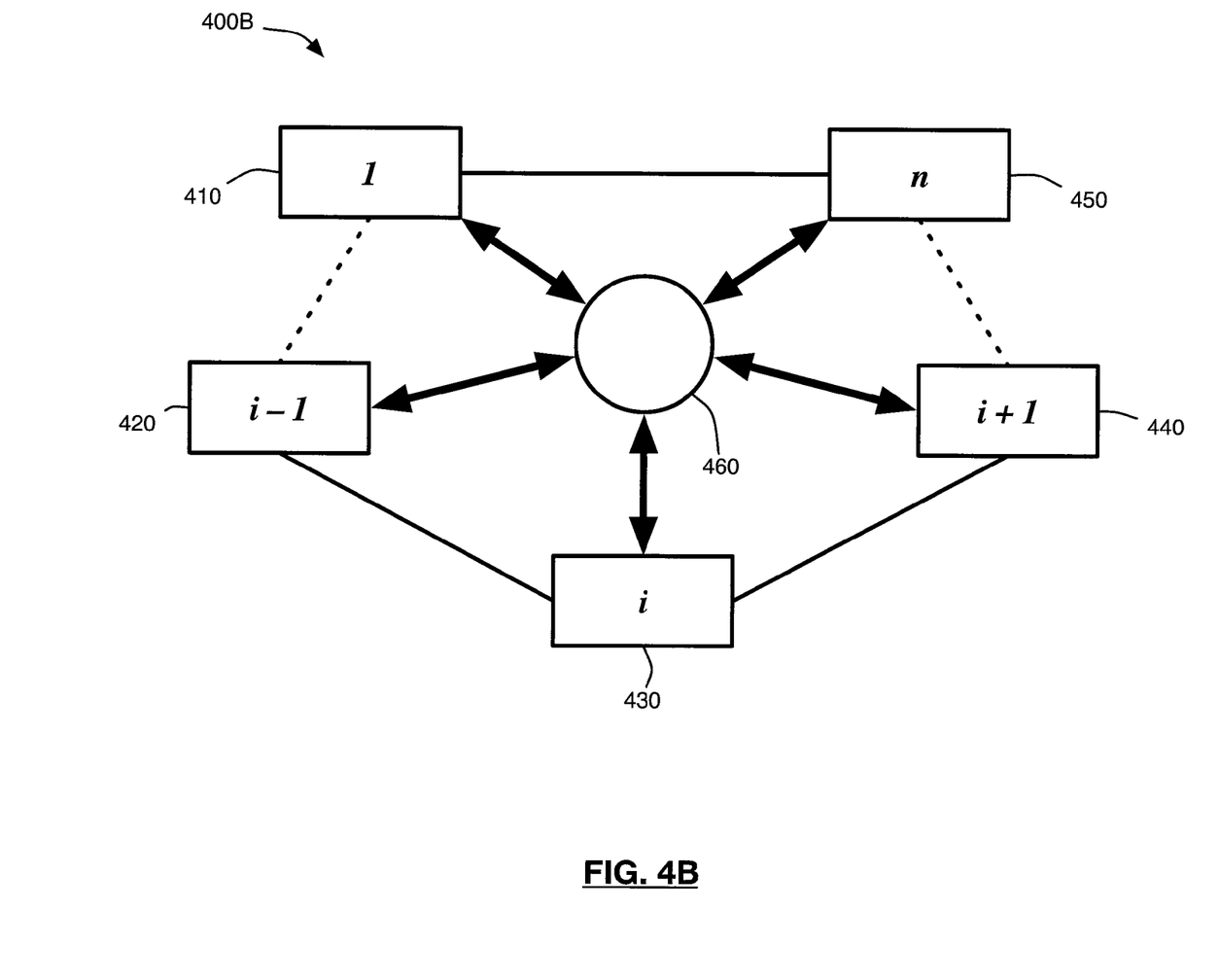
FIG. 4B is a block diagram illustrating a group of devices in another example implementation.

In some embodiments, each of the devices in a device group may also be coupled to a hub, which is configured to assist with the transmission of data to and from the various devices in the device group in the performance of at least one embodiment of a method described herein. Referring now to FIG. 4B, there is illustrated device group 400B, which further comprises a hub device 460. Hub device 460 may be a network relay, such as a switch or router, a network server, personal computer, or any communications device suitable for relaying data transmissions between devices. In some embodiments, one or more of computing devices 410 to 450 may serve as hub device 460. Hub device 460 is configured to relay data transmissions between devices in device group 400B, and may be configured to perform further processing on the data being transmitted.

Figure 5:
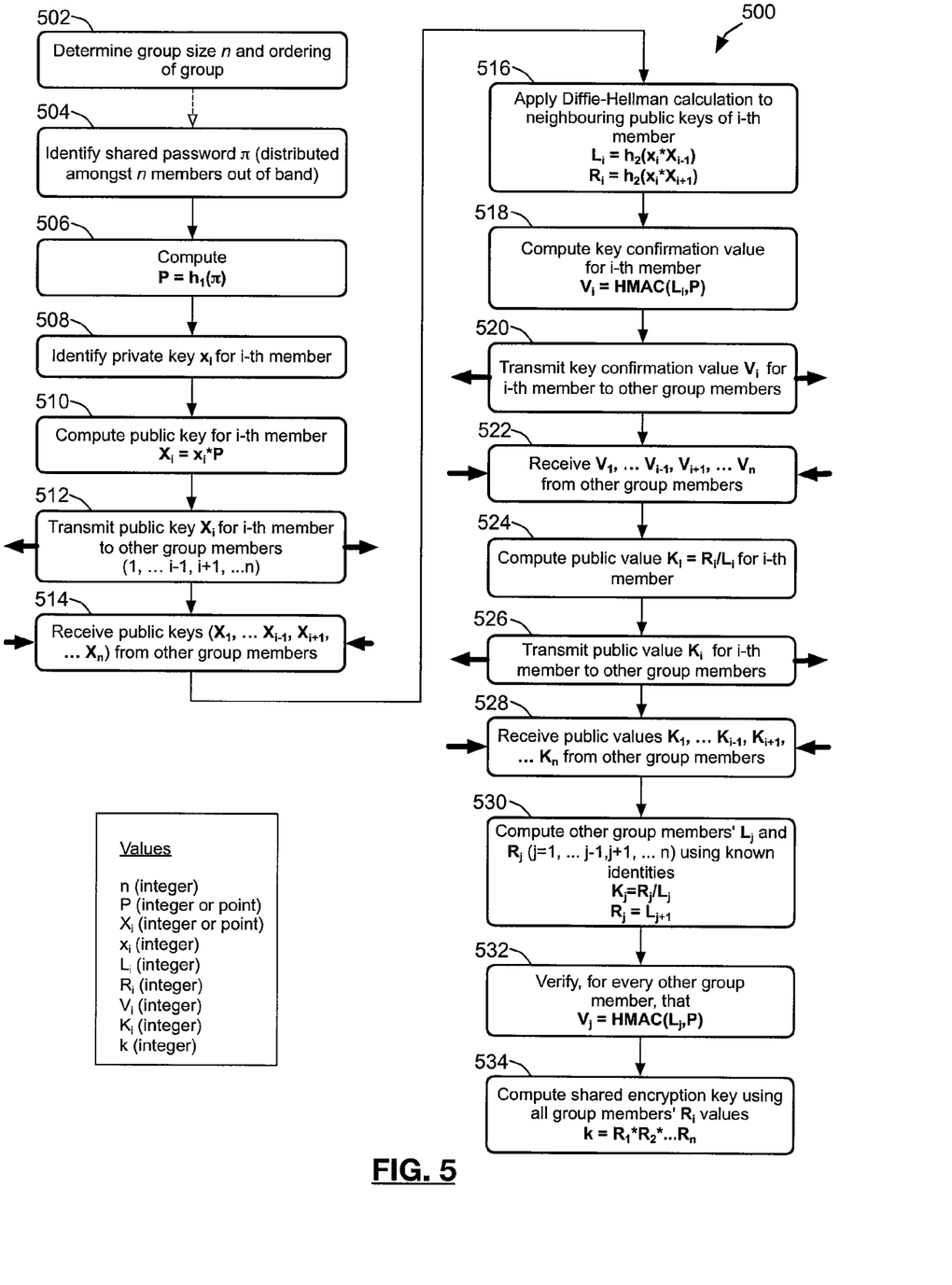
FIG. 5 is a flowchart illustrating acts of a method of computing a group encryption key, in accordance with at least one embodiment.

Referring now to FIG. 5, there is shown a flowchart illustrating acts of a method of computing a group encryption key, in accordance with at least one embodiment. Each device in a device group (see e.g. device groups 400A and 400B of FIGS. 4A and 4B respectively) may be configured to carry out acts of the illustrated method. In at least one embodiment, acts of method 500 are performed by a processor executing an application (e.g., comprising one or more application modules) residing on a mobile device, such as mobile device 100.

By way of example, the illustrated method will be described as it may be carried out on a given (i-th) device 430 of FIGS. 4A and 4B. However, it will be understood that the acts of the method would be contemporaneously performed, in parallel, by each device in the device group, in at least one embodiment.

With respect to device 430, device 420 is defined as the left neighbor of device 430, and device 440 is defined as the right neighbor of device 430. In the example of FIGS. 4A and 4B, if there are five devices in the device group (n=5), then device 450 would be defined as the left neighbor of device 410, and device 420 would be defined as the right neighbor of device 410.

It will be understood that each particular device in a device group will define different left and right neighbors, depending on the number of devices and the ordering of the devices in the device group.

Prior to carrying out the method 500, the devices in the device group are determined. The devices that are to be part of the device group may be initially identified by an administrator, for example.

At 502, the size n of the device group is determined by counting the number of devices in the device group. The devices of the device group are then ordered, for example, by assigning each device an index i from 1 to n. The ordering of the devices may be determined as described above.

Prior to performing further acts in the method of computing a group encryption key, the users of devices 410 to 450 will have distributed among themselves a shared password ($\pi$). In one embodiment, the shared password is distributed out-of-band, for example, by printing it on a piece of paper, voice communication, or any other suitable means for distributing the password privately.

In some embodiments, each device may also be made aware of the device group size (n) and its position in the device group order at this stage. In variant embodiments, the order and position may be determined at any time prior to 514, so that each device knows how many responses to anticipate. In one embodiment, a group administrator maintains a record of the device group size and positioning, and sends an updated list of members to the device group as new members are added to the device group. In variant embodiments, the device group may be "bootstrapped" by building up by one device group member at a time. Accordingly, new members may be notified who the existing device group members are, and existing members notified that a new member has joined the device group.

In some embodiments, group encryption parameters may also be established at this stage. For example, in embodiments implemented using elliptic curves, an elliptic curve suitable for use in cryptography may be identified for use by the group devices (e.g. by an administrator). The elliptic curve and group encryption parameters may be selected from lists of elliptic curves suitable for use in cryptography, such as those identified by the National Institute of Standards and Technology (NIST) or the Standards for Efficient Cryptography Group (SECG). In other embodiments, other cryptographic algorithms, such as those relying on discrete logarithms or integer factorization, may be used, for example, in which case group encryption parameters may comprise parameters suitable for applications of the selected algorithm.

In one embodiment, acts 504 to 534 are performed at each device in the device group. For ease of exposition, reference will be made generally to the i-th device 430 in the following description.

A group key may generally be established using the Burmester and Desmedt protocol. In implementations using elliptic curves, the Burmester and Desmedt protocol would have required a public key to be calculated that is a function of a generator G of an elliptic curve group. However, in the method of an embodiment described herein, the Burmester and Desmedt protocol is modified by incorporating the use of a shared password, as would be utilized in SPEKE. In particular, rather than using G, a result P that is calculated as a function of the shared password is employed when calculating the public key.

At 504, device 430 identifies the shared password ($\pi$).

For example, a user of device 430 may enter the password using a keyboard or other input means, or the password may be retrieved from a memory.

At 506, device 430 computes a result (P) of a cryptographic hash function $h_1$, such as SHA-512, with the shared password ($\pi$) as input.

In one embodiment, a predetermined fixed string may first be prepended to the password before computing the hash function. The predetermined fixed string may have been selected when choosing the group encryption parameters. It will be appreciated that the hash function may be a mathematical function that operates upon a numeric value. Accordingly, before being supplied as input, the password text may first be converted into a numeric equivalent, for example by concatenating the hexadecimal ASCII character codes for each character of the password. In some embodiments, alternative character coding schemes, such as Unicode, may be used.

In embodiments where elliptic curve cryptography is used, the result of hash function $h_1$ may be used to identify a point (P) on the pre-selected elliptic curve.

By convention, the result of the hash function $h_1$ may be mapped to an x-coordinate of a point on the curve. However, it will be appreciated that the result may also be mapped to a point on the elliptic curve in some other manner.

If the result of the hash function fails to identify a point on the pre-selected elliptic curve, the numeric value corresponding to the password may be changed (e.g. by incrementing the numeric value corresponding to the password by one or some other pre-determined amount), and the hash function re-applied. This process may be repeated as necessary until a valid point on the pre-selected elliptic curve is obtained. In practice, due to the randomization properties of cryptographic hash functions, a valid coordinate can usually be found within a few attempts. Once a valid coordinate is obtained, device 430 calculates a corresponding coordinate satisfying the elliptic curve function to identify the point (P) on the curve.

At 508, a private key ($x_i$) is identified for device 430. In embodiments using elliptic curve cryptography, the private key may be a randomly or pseudo-randomly selected integer suitable for a chosen security level. The size used may depend on the desired level of security and available computational resources. The security level may be chosen as part of the group encryption parameters as described above. Normally, the desired security level dictates which elliptic curve to use, which dictates the size of the private keys to be used.

At 510, a public key ($X_i$) for device 430 is calculated. In particular, it is known that two-party SPEKE combines aspects of the Diffie-Hellman key exchange protocol with a secret generator. In this embodiment, use of the secret generator, in addition to verification acts will be applied in method 500 to provide for authentication of the devices in the device group.

In one embodiment, the private key ($x_i$) is only needed during the lifetime of the protocol, and can be discarded afterwards (i.e., private key ($x_i$) and public key ($X_i$) comprise an ephemeral keypair). In a variant embodiment, the public key may be retained in case the device needs to perform another key establishment sequence. In some variant embodiments, the keypair may later be used for other authentication purposes (e.g., to digitally sign and/or verify data). However, in general, security may be reduced if keypairs are reused for different purposes. Accordingly, more conservative design dictates sending a separate authentication public key encrypted with the established shared encryption key, when additional authentication of other data is required.

The public key ($X_i$) for device 430 is generally a function of the private key ($x_i$) associated with device 430 as identified at 508, and of the shared password ($\pi$) identified at 504. More specifically, in one embodiment, the public key ($X_i$) for device 430 is computed as a product of the private key ($x_i$) associated with device 430 and P, which is a function of the hash of the shared password ($\pi$) as computed at 506. In embodiments where elliptic curve cryptography is used, an elliptic curve scalar (point) multiplication is performed in computing the product, since P will be a point on the elliptic curve. Accordingly, in embodiments where an elliptic curve is used, the public key ($X_i$) will also be a point on the selected elliptic curve.

Upon computing the public key ($X_i$), at 512, device 430 transmits the public key ($X_i$) to at least one other device in the device group. In one embodiment, the public key ($X_i$) for device 430 is transmitted only to the left and right neighbors of device 430. In some embodiments, device 430 transmits the public key ($X_i$) to every other device of the device group in a broadcast communication. Accordingly, at 514, device 430 receives public keys (e.g. $X_1, \ldots X_{i-1}, X_{i+1}, \ldots X_n$) for other devices of the device group, and at least for the left neighbor and the right neighbor of device 430 (e.g. $X_{i-1}, X_{i+1}$) in one embodiment.

With respect to acts 512 and 514, the public keys may be transmitted between devices of the device group directly. In variant embodiments, an intermediate hub device (see e.g. hub device 460 of FIG. 4B). may be provided and configured to route the public keys and possibly other data to the various devices of the device group. Accordingly, in embodiments with a hub device, each individual device does not need to keep track of the location of each of the other devices in the device group, as location information need only be maintained at the hub device 460. In embodiments with a hub device, the hub device need not be trusted by the device group members.

At 516, device 430 applies a Diffie-Hellman computation to derive a first Diffie-Hellman result ($L_i$) and a second Diffie-Hellman result ($R_i$) for device 430, using the respective public keys ($X_{i-1}, X_{i+1}$) for the neighboring devices received at 514. In one embodiment, the product of the private key ($x_i$) associated with device 430 and the public key ($X_{i-1}$) of the left neighbor is computed, and the product of the private key ($x_i$) associated with device 430 and the public key ($X_{i+1}$) of the right neighbor is also computed. In one embodiment, the first Diffie-Hellman result ($L_i$) for device 430 is computed as a hash of the product of the private key ($x_i$) associated with device 430 and the public key ($X_{i-1}$) of the left neighbor, whereas the second Diffie-Hellman result ($R_i$) is computed as a hash of the product of the private key ($x_i$) associated with device 430 and the public key ($X_{i+1}$) of the right neighbor, using a cryptographic hash function $h_2$.

Hash function $h_2$ may be, for example, SHA-512. In one embodiment, hash function $h_2$ is different from hash function $h_1$ as employed at 506. As with hash function $h_1$, the input to the hash function may be padded by prepending a fixed string to the input. If fixed strings are used to pad input prior to applying both $h_1$ and $h_2$, the fixed strings used may be different for each hash function.

In embodiments where elliptic curve cryptography is used, the Diffie-Hellman computation involves elliptic curve scalar (point) multiplication performed using respective public keys of the left and right neighbors, which are points on the selected elliptic curve, and the private key ($x_i$) associated with device 430, which is an integer. A coordinate of the resulting point, for example the x-coordinate, may then be supplied to hash function $h_2$ to produce integer results for $L_i$ and $R_i$.

In one embodiment, to verify that all devices of the device group have knowledge of the correct shared password ($\pi$), key confirmation values are computed at each device by combining secrets to produce a public value.

For example, at 518, device 430 computes a key confirmation value ($V_i$) for device 430, by computing a keyed hash message authentication code (HMAC) based on a hash of the shared password ($\pi$) (e.g. P, as computed at 506), and using $L_i$ as derived for device 430 at 516 as the key. In a variant embodiment, the key confirmation value may be computed using $R_i$ as derived for device 430 at 516 as the key. In still other embodiments, the keyed hash message authentication code may be computed based on $L_i$ or $R_i$ with P as the key. Additionally, the keyed hash message authentication code may also take as input other keys or values, including one or more secret values, to produce a public value.

At 520, device 430 transmits the key confirmation value ($V_i$) for device 430 to each of all other devices of the device group. In one example embodiment, the key confirmation value is transmitted in a broadcast communication. Accordingly, at 522, device 430 will receive key confirmation values (i.e. $V_1, \ldots V_{i-1}, V_{i+1}, \ldots V_n$) from each of all other devices of the device group.

With respect to acts 520 and 522, the key confirmation values may be transmitted between devices of the device group directly. In variant embodiments, an intermediate hub device (see e.g. hub device 460 of FIG. 4B), may be provided and configured to route the key confirmation values and possibly other data to the various devices of the device group. Accordingly, in embodiments with a hub device, each individual device does not need to keep track of the location of each of the other devices in the device group, as location information need only be maintained at the hub device 460.

At 524, device 430 computes a public value ($K_i$) for device 430, in accordance with a group key establishment protocol (e.g. Burmester and Desmedt protocol), where the public value ($K_i$) for device 430 is computed as a function of the private key ($x_i$) associated with device 430 and of a public key (e.g. $X_{i-1}, X_{i+1}$) of each of at least one other device of the device group.

In one embodiment, the public value $K_i$ for device 430 is computed by dividing the second Diffie-Hellman result ($R_i$) for device 430 as derived at 516, with the first Diffie-Hellman result ($L_i$) for device 430 as derived at 516, modulo a suitable prime number. Both $R_i$ and $L_i$ are treated as integers. Accordingly, the public value ($K_i$) for device 430 is a function of the private key associated with the private key ($x_i$) associated with device 430 and of a public key (e.g. $X_{i-1}, X_{i+1}$) of each of at least one other device of the device group, since the first Diffie-Hellman result ($L_i$) for device 430 is derived as a function of the private key ($x_i$) associated with device 430 and the public key ($X_{i-1}$) of the left neighbor of device 430 and the second Diffie-Hellman result ($L_i$) for device 430 is derived as a function of the private key ($x_i$) associated with device 430 and the public key ($X_{i+1}$) of the right neighbor of device 430 as shown at 516.

At 526, device 430 transmits the public value (K) for device 430 as computed at 524 to each of all of the other devices of the device group. In one example embodiment, the public value ($K_i$) is transmitted in a broadcast communication. At 528, device 430 receives the public value (i.e. $K_1, \ldots K_{i-1}, K_{i+1}, \ldots K_n$) of each of all of the other devices of the device group.

With respect to acts 526 and 528, the public values ($K_1, \ldots K_n$) may be transmitted between devices of the device group directly. In variant embodiments, an intermediate hub device (see e.g. hub device 460 of FIG. 4B) may be provided and configured to route the public values and possibly other data to the various devices of the device group. Accordingly, in embodiments with a hub device, each individual device does not need to keep track of the location of each of the other devices in the device group, as location information need only be maintained at the hub device 460.

At 530, device 430 applies a Diffie-Hellman computation to derive at least one of a first Diffie-Hellman result ($L_j$) and a second Diffie-Hellman result ($R_j$) for each of all other devices of the device group, using the public values ($K_1, K_{i-1}, K_{i+1}, \ldots K_n$) received from the other devices of the device group at 528. In order to compute $L_j$ and $R_j$ for each j, j=1 . . . i−1, i+1 . . . n, the following identities may be used:

$$K_j = R_j/L_j \text{ and} \quad \text{(see e.g. 524 of FIG. 5)}$$

$$R_j = L_{j+1} \quad \text{(see below).}$$

Assuming that the public keys ($X_1, \ldots X_n$) of each device have been similarly computed using the same P (e.g. using the same hash function $h_1$ and the shared password), it follows that:

$$\text{since} \tag{1}$$

$$X_i = x_i * P$$

(e.g. see 510 of FIG. 5)

and $$X_{i+1} = x_{i+1} * P$$

then $$\begin{aligned} x_i * X_{i+1} &= x_i * (x_{i+1} * P) \\ &= (x_i * x_{i+1}) * P \\ &= (x_{i+1} * x_i) * P \\ &= x_{i+1} * (x_i * P) \\ &= x_{i+1} * X_i \end{aligned}$$

or, $$x_i * X_{i+1} = x_{i+1} * X_i.$$

Accordingly, since:

$$L_i = h_2(x_i * X_{i-1}) \tag{2}$$

and $$R_i = h_2(x_i * X_{i+1}) \tag{3}$$

(e.g. see 516 of FIG. 5),
it follows that:

$$\begin{aligned} R_i &= h_2(x_i * X_{i+1}) & \text{(from (3))} \\ &= h_2(x_{i+1} * X_i) & \text{(applying (1))} \\ &= L_{i+1}. & \text{(applying (2))} \end{aligned}$$

Therefore, $R_i = L_{i+1}$. Similarly, it can be shown that $L_i = R_{i-1}$. More generally, for the j-th device, $R_j = L_{j+1}$ and $L_j = R_{j-1}$.

Since $K_j = R_j/L_j$ for each device, then by setting j=i+1, the i-th device 430 can compute $R_{i+1} = K_{i+1} * L_{i+1} = K_{i+1} * R_i$, (since $R_i = L_{i+1}$). The i-th device 430 knows its own $R_i$ (see 516 of FIG. 5). Accordingly, each device in the device group will be able to recover $R_{i+1}$, and in further iterations, the second Diffie-Hellman result ($R_j$) for every other device in the device group can also be recovered at the i-th device. It will be understood that the first Diffie-Hellman result ($L_j$) for every other device can also be recovered if desired, using the identities noted above.

In one embodiment, each device of the device group can then verify that every other device of the device group had knowledge of the correct shared password ($\pi$). At 532, i-th device 430 computes a verification value for each of all other mobile devices j=1 . . . i−1, i+1 . . . n, where the verification value is a function of the shared password ($\pi$) as known to the i-th device 430. For example, the verification value for the j-th device may be computed as an HMAC (in the same manner as at 518) based on the hash of the shared password ($P = h_1(\pi)$) and the first Diffie-Hellman result ($L_j$) derived for the j-th device at 530. In a variant embodiment, the verification value for the j-th device may be computed as an HMAC based on the hash of the shared password ($P = h_1(\pi)$) and the second Diffie-Hellman result ($R_j$) derived for the j-th device at 530. Other formulations for the verification value may be employed in variant embodiments.

Once a verification value at device 430 is computed for each of all the other devices of the device group, each verification value can be compared with respective key confirmation values (i.e. $V_1, \ldots V_{i-1}, V_{i+1}, \ldots V_n$) as previously received from the other devices at 522, to determine if there is a mismatch. This act of verification enables each device of the device group to independently verify that each other device of the device group had knowledge of the correct shared password ($\pi$). If there is a mismatch between the received key confirmation value and the computed verification value for a particular device, then it is possible to pinpoint that particular device as the source of error (e.g. the user of that particular device may not know the password, or had entered it incorrectly). A device that failed to supply a valid key confirmation value may be given one or more opportunities to resubmit another key confirmation value. In some embodiments, the device that fails to supply a valid key confirmation value may be excluded from the device group and the protocol reinitiated. It will be appreciated that still other error-handling mechanisms may be employed in the event of a mismatch.

In variant embodiments, device 430 may only perform the verification at 532 for a subset of the devices of the device group.

At 534, device 430 computes a shared encryption key (k). In one embodiment, the shared encryption key (k) is a product of Diffie-Hellman results. For example, the shared encryption key may be a product of the second Diffie-Hellman results (R) for all devices of the device group (i.e. $k=R_1 *R_2 * \ldots *R_n$). In another embodiment, the shared encryption key may be a product of the first Diffie-Hellman results (L) for all devices of the device group (i.e. $k=L_1 *L_2 * \ldots *L_n$). In other embodiments, other combinations of Diffie-Hellman results may be used to compute the shared encryption key (k).

Upon computing the shared encryption key, device 430 may use the key as a symmetric key in conjunction with a symmetric cipher, such as AES, Blowfish, or the like, to encrypt and decrypt subsequent communications with at least one other device of the device group (acts not explicitly shown in FIG. 5).

Persons skilled in the art will understand that some of the acts of method 500 may be performed in an order different than that shown by way of illustration in FIG. 5. For example, one or more of acts 518 to 522 in which key confirmation values are computed, transmitted and received, may be performed later in method 500, but prior to the verification act at 532.

At least some of the acts of a method of computing a shared encryption key in accordance with at least one embodiment described herein may be provided as software instructions stored on non-transitory computer-readable storage media, the instructions being executable by a processor of a computing device (e.g. a mobile device).

A number of embodiments have been described herein. However, it will be understood by persons skilled in the art that other variants and modifications may be made without departing from the scope of the embodiments as defined in the claims appended hereto.

The invention claimed is:

1. A method of computing a shared encryption key (k) for a group of n mobile devices, the group of n mobile devices comprising at least three mobile devices, wherein the method comprises, for an i-th mobile device of the group of n mobile devices:

a hardware processor computing a public key (Xi) for the mobile device for transmission to at least one other mobile device of the group, wherein the public key (Xi) for the mobile device is a function of at least a shared password ($\pi$) known to all mobile devices of the group;

the hardware processor computing a public value (Ki) for the mobile device for transmission to other mobile devices of the group, wherein the public value (Ki) for the mobile device is a function of at least a public key of another mobile device of the group that is also computed using the shared password ($\pi$);

the hardware processor computing the shared encryption key (k) based upon public values of other mobile devices of the group, wherein each of the public values of other mobile devices of the group is a function of at least one other public key of at least one other mobile device of the group that is also computed using the shared password; and the hardware processor using the shared encryption key (k) to encrypt and decrypt subsequent communications with the at least one other device of the group.

2. The method of claim 1, wherein the shared encryption key (k) is computed in accordance with a group key establishment protocol, and the group key establishment protocol comprises a Burmester and Desmedt protocol.

3. The method of claim 1, further comprising, for the i-th mobile device of the group of n mobile devices:

transmitting the public key ($X_i$) for the mobile device to the at least one other mobile device of the group of n mobile devices; and receiving the public key at least one second other mobile device of the group of n mobile devices.

4. The method of claim 3, wherein the i-th mobile device of the group of n mobile devices is coupled to a hub device, and wherein at least one of said transmitting the public key or receiving the public key is performed via the hub device.

5. The method of claim 1, further comprising, for the i-th mobile device of the group of n mobile devices:

transmitting the public value ($K_i$) for the mobile device to each of all other mobile devices of the group of n mobile devices; and receiving the public value ($K_1, \ldots K_{i-1}, K_{i+1}, \ldots K_n$) of each of all other mobile devices of the group of n mobile devices.

6. The method of claim 5, wherein the i-th mobile device of the group of n mobile devices is coupled to a hub device, and wherein at least one of said transmitting the public value or receiving the public value is performed via the hub device.

7. The method of claim 1, further comprising, for the i-th mobile device of the group of n mobile devices:

computing a key confirmation value ($V_i$) for the mobile device, wherein the key confirmation value ($V_i$) for the mobile device is a function of at least the shared password ($\pi$);

transmitting the key confirmation value ($V_i$) for the mobile device to each of all other mobile devices of the group of n mobile devices;

receiving a key confirmation value ($V_1, \ldots V_{i-1}, V_{i+1}, \ldots V_n$) from each of all other mobile devices of the group of n mobile devices;

computing a verification value for each of all other mobile devices of the group of n mobile devices, wherein the verification value is a function of at least the shared password ($\pi$); and for at least one other mobile device of the group of n mobile devices, comparing the key confirmation value ($V_i$)

received from the at least one other mobile device with the verification value computed for the at least one other mobile device to determine if there is a mismatch.

8. The method of claim 7, wherein the i-th mobile device of the group of n mobile devices is coupled to a hub device, and wherein at least one of said transmitting the key confirmation value or receiving the key confirmation value is performed via the hub device.

9. The method of claim 7,
wherein for the i-th mobile device of the group of n mobile devices, the public key ($X_i$) for the mobile device is computed as a product of the private key ($x_i$) associated with the mobile device and a hash ($h_1(\pi)$) of the shared password;
wherein the group of n mobile devices is defined such that a left neighbor (i−1) and a right neighbor (i+1) is defined for the i-th mobile device of the group of n mobile devices; and
wherein the method further comprises, for the i-th mobile device of the group of n mobile devices:
applying a Diffie-Hellman computation to derive at least a first Diffie-Hellman result ($L_i$) and a second Diffie-Hellman result ($R_i$) for the mobile device, wherein the first Diffie-Hellman result ($L_i$) for the mobile device is a function of at least the private key ($x_i$) associated with the mobile device and a public key ($X_{i-1}$) of the left neighbor of the mobile device, and wherein the second Diffie-Hellman result ($R_i$) for the mobile device is a function of at least the private key ($x_i$) associated with the mobile device and a public key ($X_{i+1}$) of the right neighbor of the mobile device;
wherein the public value ($K_i$) computed for the mobile device is a function of at least the first Diffie-Hellman result ($L_i$) and the second Diffie-Hellman result ($R_i$) for the mobile device; and
wherein the key confirmation value ($V_i$) for the mobile device, is a function of at least the hash ($h_1(\pi)$) of the shared password, and at least one of the first Diffie-Hellman result ($L_i$) or the second Diffie-Hellman result ($R_i$) for the mobile device.

10. The method of claim 9, wherein for the i-th mobile device of the group of n mobile devices:
the first Diffie-Hellman result ($L_i$) for the mobile device is computed as a hash ($h_2(x_i*X_{i-1})$) of a product of the private key associated with the mobile device and the public key of the left neighbor of the mobile device, and
the second Diffie-Hellman result ($R_i$) for the mobile device is computed as a hash ($h_2(x_i*X_{i+1})$) of a product of the private key associated with the mobile device and the public key of the right neighbor of the mobile device.

11. The method of claim 9, further comprising, for the i-th mobile device of the group of n mobile devices:
applying a Diffie-Hellman computation to derive at least one of a first Diffie-Hellman result (Lj) or a second Diffie-Hellman result (Rj) for each of all other mobile devices of the group of n mobile devices, such that the public value ($K_1, \ldots K_{i-1}, K_{i+1}, \ldots K_n$) of each of all other mobile devices of the group of n mobile devices is used;
wherein the verification value computed for a given other j-th mobile device of the group of n mobile devices is a function of at least the hash ($h_i(\pi)$) of the shared password and at least one of the first Diffie-Hellman result (Lj) or the second Diffie-Hellman result (Rj) derived for the given other j-th mobile device.

12. The method of claim 11, wherein for the i-th mobile device of the group of n mobile devices:
the key confirmation value ($V_i$) computed for the mobile device is computed as a keyed-hash message authentication code based at least on the hash ($h_1(\pi)$) of the shared password and on the at least one of the first Diffie-Hellman result ($L_i$) or the second Diffie-Hellman result ($R_i$) for the mobile device; and
the verification value computed for the given other j-th mobile device of the group of n mobile devices is computed as a keyed-hash message authentication code based at least on the hash ($h_1(\pi)$) of the shared password and the at least one of the first Diffie-Hellman result (Lj) or the second Diffie-Hellman result (Rj) derived for the given other j-th mobile device.

13. The method of claim 11, wherein the shared encryption key (k) is computed as a product of a plurality of Diffie-Hellman results, the plurality of Diffie-Hellman results comprising at least one of a first Diffie-Hellman result ($L_1, \ldots L_n$) for each of all mobile devices of the group of n mobile devices or a second Diffie-Hellman result ($R_1, \ldots R_n$) for each of all mobile devices of the group of n mobile devices.

14. The method of claim 1, wherein the shared encryption key (k) comprises a symmetric key.

15. The method of claim 1, further comprising, prior to computing the public key ($X_i$) for the i-th mobile device of the group of n mobile devices:
distributing the shared password ($\pi$) to all mobile devices of the group of n mobile devices.

16. The method of claim 1, wherein for the i-th mobile device of the group of n mobile devices, the public key ($X_i$) for the mobile device is computed as a product of the private key ($x_i$) associated with the mobile device and a hash ($h_1(\pi)$) of the shared password.

17. The method of claim 16, wherein the hash ($h_1(\pi)$) of the shared password is defined as a point on an elliptic curve.

18. The method of claim 16, wherein the group of n mobile devices is defined such that a left neighbor (i−1) and a right neighbor (i+1) is defined for the i-th mobile device of the group of n mobile devices, and wherein the method further comprises, for the i-th mobile device of the group of n mobile devices:
applying a Diffie-Hellman computation to derive at least a first Diffie-Hellman result ($L_i$) and a second Diffie-Hellman result ($R_i$) for the mobile device, wherein the first Diffie-Hellman result ($L_i$) for the mobile device is a function of at least the private key ($x_i$) associated with the mobile device and a public key ($X_{i-1}$) of the left neighbor of the mobile device, and wherein the second Diffie-Hellman result ($R_i$) for the mobile device is a function of at least the private key ($x_i$) associated with the mobile device and a public key ($X_{i+1}$) of the right neighbor of the mobile device;
wherein the public value ($K_i$) computed for the mobile device is a function of at least the first Diffie-Hellman result ($L_i$) and the second Diffie-Hellman result ($R_i$) for the mobile device.

19. A mobile device for computing a shared encryption key (k) in a group of n mobile devices, the group of n mobile devices comprising at least three mobile devices, the mobile device comprising:
a hardware processor configured to:
compute a public key (Xi) for the mobile device for transmission to at least one other mobile device of the group, wherein the public key (Xi) for the mobile device is a function of at least a shared password ($\pi$) known to all mobile devices of the group;
compute a public value (Ki) for the mobile device for transmission to other mobile devices of the group, wherein the public value (Ki) for the mobile device is a function of at least a public key of at least another mobile device of the group that is also computed using the shared password ($\pi$);

compute the shared encryption key (k) based upon public values of other mobile devices of the group, wherein each of the public values of other mobile devices of the group is a function of at least one other public key of at least one other mobile device of the group that is also computed using the shared password; and use the shared encryption key (k) to encrypt and decrypt subsequent communications with the at least one other device of the group.

20. A non-transitory computer readable storage medium having stored therein a computer program which, when executed by a processor of a mobile device, causes the processor to perform a method of computing a shared encryption key (k) for a group of n mobile devices, the group of n mobile devices comprising at least three mobile devices, wherein the method comprises:

for an i-th mobile device of the group of n mobile devices:

computing a public key (Xi) for the mobile device for transmission to at least one other mobile device of the group, wherein the public key (Xi) for the mobile device is a function of at least a shared password ($\pi$) known to all mobile devices of the group;

computing a public value (Ki) for the mobile device for transmission to other mobile devices of the group, wherein the public value (Ki) for the mobile device is a function of at least a public key of at least another mobile device of the group that is also computed using the shared password ($\pi$);

computing the shared encryption key (k) based upon public values of other mobile devices of the group, wherein each of the public values of other mobile devices of the group is a function of at least one other public key of at least one other mobile device of the group that is also computed using the shared password; and using the shared encryption key (k) to encrypt and decrypt subsequent communications with the at least one other device of the group.

* * * * *